United States Patent [19]
Kreider et al.

[11] 3,795,042
[45] Mar. 5, 1974

[54] METHOD FOR PRODUCING COMPOSITE MATERIALS

[75] Inventors: Kenneth G. Kreider, Glastonbury; Karl M. Prewo, Manchester, both of Conn.

[73] Assignee: United Aircraft Corporation, East Hartford, Conn.

[22] Filed: Aug. 22, 1972

[21] Appl. No.: 282,818

[52] U.S. Cl............... 29/472.3, 29/419, 29/497.5, 29/498, 29/504
[51] Int. Cl............................................. B23k 31/02
[58] Field of Search ....... 29/472.3, 419, 498, 497.5, 29/504

[56] References Cited
UNITED STATES PATENTS

| 2,468,206 | 4/1949 | Keene et al.................. 29/472.3 X |
| 3,419,952 | 1/1969 | Carlson..................... 29/472.3 X |
| 3,436,816 | 4/1969 | Lemelson.................... 29/472.3 X |
| 3,551,996 | 1/1971 | Sumner et al................ 29/472.3 |
| 3,606,667 | 9/1971 | Kreider..................... 29/423 |
| 3,615,277 | 10/1971 | Kreider et al.............. 29/472.3 X |

Primary Examiner—Richard B. Lazarus
Attorney, Agent, or Firm—John D. Del Ponti

[57] ABSTRACT

A method for continuously manufacturing in air high strength metal matrix composites reinforced with a plurality of parallel layers of unidirectional filaments comprising positioning a plurality of filament reinforced aluminum matrix monolayer tapes in a stack, pressing the stack between at least one pair of rollers heated to a predetermined temperature at pressures of approximately 100–10,000 psi to reduce its thickness and cause densification, said temperature being lower than the liquidus temperature of the aluminum matrix but being sufficiently high, in combination with the pressure, to cause bonding of the aluminum matrix of each tape to the filaments embedded therewithin and to contiguous portions of the adjacent tapes.

5 Claims, 3 Drawing Figures

METHOD FOR PRODUCING COMPOSITE MATERIALS

BACKGROUND OF THE INVENTION

Conventionally, the manufacture of high modulus, high strength metal matrix composites in the aerospace industry is carried out in two major stages. In the first, monolayer tapes of high modulus, high strength brittle filaments of boron, silicon carbide or silicon carbide coated boron are sandwiched between a metal foil and a plasma sprayed metal coating, the metal being aluminum, magnesium or alloys thereof, by a winding and plasma spray operation as disclosed, for example, in U.S. Pat. No. 3,606,667 assigned to the present assignee. The second stage is the hot press diffusion bonding of multiple layers of these tapes to produce a multilayered composite. Typically, this stage requires the use of a vacuum hot press capable of providing high pressures generally in the range of 2,000-10,000 psi for a time of 1 hour at elevated temperatures, usually 400°-600° C. This conventional diffusion bonding procedure requires bonding pressures in excess of 2,000 psi, a time cycle of several hours and an atmosphere of vacuum or inert gas. The lengthy time requirement is related to the practice of inserting the composite into the press prior to vacuum pump-down and heat-up and subsequent vacuum cooling after hot pressing. The heavy loading train plus dies generally require high powers and long times when they are enclosed in the vacuum system. The required time for heat-up bonding and cool-down to and from temperature, coupled with the magnitude of the pressures and temperatures needed for bonding can cause, in many cases, fiber degradation within the composite. In addition the need for pressures on the order of 10,000 psi can unduly limit the size of the composite to be manufacturered to the capacity of the hot press apparatus.

To overcome the limitations of diffusion bonding composites between fixed dies, the present invention, as described hereinafter, provides an inexpensive, continuous and flexible procedure for the production of fully consolidated and bonded multilayered composites.

SUMMARY OF THE INVENTION

The present invention relates to a process for manufacturing filament reinforced composites. More particularly, it relates to a method for manufacturing high strength monolayer or multilayer metal matrix composites reinforced with a plurality of unidirectional filaments which can be done in air as a continuous process.

The present invention contemplates a roll bonding technique comprising, in a preferred embodiment, positioning a plurality of filament reinforced aluminum tapes in a laminated stack, the tapes each comprising a plurality of unidirectional filaments embedded in a plasma sprayed aluminum matrix, placing the lamination of tapes between at least one pair of rollers preheated to a predetermined temperature, pressing the stacked tapes between the rollers at a pressure of approximately 100-10,000 psi, preferably 200-5,000 psi, to reduce their thickness and cause densification, said temperature being lower than the liquidus temperature of the aluminum matrix but being sufficiently high, in combination with the pressure, to cause bonding of the plasma sprayed metal matrix portion of each tape to the filaments embedded therewithin and to contiguous portions of adjacent tapes and removing the densified composite. The inventive process is particularly suited for usage as an open air continuous process wherein successive portions of the laminated tape are bonded and densified by continuous relative linear motion between the composite workpiece and the rollers. The method is preferably performed either with the temperature maintained below the solidus with a pressure of 2,000-10,000 psi, preferably 2,000-5,000 psi, or at a temperature between the solidus and liquidus with a pressure of approximately 100-2,000 psi, preferably 500-2,000 psi. In either case, thickness reduction should be kept to not more than 50 percent.

The inventive concept is applicable to various filaments, both flexible, such as stainless steel, steel, tungsten, molybdenum and titanium, and relatively brittle, such as boron, silicon carbide, silicon carbide coated boron, boron carbide, alumina and carbon which can be embedded by plasma spraying in an aluminum matrix. Unless otherwise stated, the word aluminum is meant hereby to embrace both the elemental metal and its alloys. In a preferred embodiment, relatively brittle high modulus, high strength filaments such as the boron, silicon carbide and silicon carbide coated boron filaments are embedded in the plasma sprayed aluminum which is adhered to a metal, preferably aluminum, foil. Although adjacent tapes may be laid up as cross plies at various angles, it is preferred that they be uniaxial and most preferably, with all filaments oriented with their axes parallel to the axes of the rollers.

The inventive process is particularly directed toward a rapid continuous method for densifying and bonding plasma sprayed aluminum tapes. It has been found that even though plasma sprayed aluminum is characterized by surface oxide layers, the general porosity thereof, typically approximately 15 percent, allows for a large amount of local deformation during densification which acts to break up the surface oxide layers that ordinarily prevent bonding. Such deformation exposes and brings into intimate bonding contact regions of virgin metal with the filaments embedded therein as well as with adjacent mating surfaces. As will be appreciated by those skilled in the art, the present process centers on a relatively short time of exposure of the composite to elevated temperature so that densification and bonding can be achieved at higher temperatures without fiber degradation and also with lower pressures so as to obviate the fiber crushing problem presently existing with cross plied material and in complexly shaped parts. In general, the bonding procedure is performed in less than 40 minutes, preferably in 2-15 minutes.

BRIEF DESCRIPTION OF THE DRAWINGS

An understanding of the invention will become more apparent to those skilled in the art by reference to the following detailed description when viewed in light of the accompanying drawings wherein.

DETAILED DESCRIPTION OF THE PREFERRED EMBODIMENT

While roll bonding, per se, is a known and commonly used method of diffusion bonding, the process is normally performed on parallel sheets of solid metal having as a requirement, oxide-free surfaces which, when subjected to particular elevated temperatures and pressures effect bonding therebetween. Typically, large deformation, caused by a reduction in thickness of more than 50 percent during one rolling pass, is used to bond oxide-free metals of Al, Mg, Cu, Pb or Zn with the operation being performed at room temperature.

When dealing with composites reinforced with filaments, however, such large thickness reductions cannot be tolerated without experiencing fiber movement or degradation. It has been found that, in general, thickness reductions in filament reinforced plasma sprayed tapes must be kept to not more than 50 percent. Otherwise significant fiber damage is inflicted through fiber bending and/or by tensile loading of the filaments by the shear stresses developed in the surrounding matrix during deformation.

Figure 1:
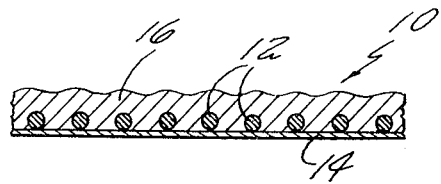
FIG. 1 is a cross-sectional view of a monolayer composite tape having a plasma sprayed coating on one side only.
Figure 2:
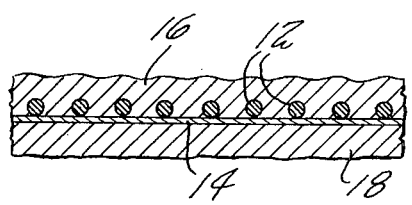
FIG. 2 is a cross-sectional view of a monolayer composite tape having a plasma sprayed coating on both sides thereof.

According to the invention multilayer fiber reinforced composites are prepared by rapidly heating a plurality of stacked filament reinforced aluminum matrix tapes to the desired temperature. As shown in FIG. 1, preferred tapes 10 comprise unidirectional filaments 12 backed by an aluminum foil sheet 14 and embedded in a plasma sprayed aluminum matrix 16. In FIG. 2 is shown a tape identical with that of FIG. 1 except for the additional plasma sprayed coating 18 on the opposite side of the foil 14. As a further alternative, the foil sheet may be omitted and a simple tape comprising filaments embedded in the plasma sprayed matrix may be utilized. The technique requires preheating of the components used in the bonding process so that the stacked tapes are heated to the predetermined temperature and subjected to the selected pressure, generally 100-10,000 psi, for a period of time of less than 40 minutes and preferably 2-15 minutes, during which time the tapes are reduced in thickness by an amount of not more than 50 percent to become densified.

Figure 3:
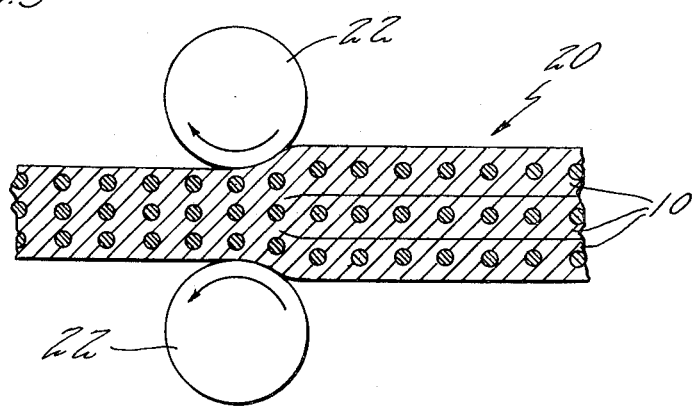
FIG. 3 is a diagrammatic view, partly in section, showing the roll bonding of a plurality of monolayer composite tapes.

As shown in FIG. 3, a plurality of tapes 10 are laminated into a stack 20 and passed between at least one roller pair 22. The tapes 10 are brought to a preselected temperature during the roll pressing by suitable heating means such as electric resistance heating coils located in the rollers themselves or by flame heating means, etc. The temperature of the workpiece during rolling must be lower than the liquidus temperature of the matrix but be sufficiently high, in combination with said pressure, to cause bonding of said matrix to said filaments and to contiguous portions of adjacent tapes. It has been found that by bringing the workpiece to temperature rapidly, i.e., in less than 5 minutes, preferably in 2 minutes, the need for a vacuum, or even an inert atmosphere is obviated and the process can be successfully accomplished in air in an essentially continuous manner.

The invention is illustrated by the following specific examples.

EXAMPLE I

Filament reinforced monolayer tapes were prepared by the procedure set forth in U.S. Pat. No. 3,606,667. A 1 mil sheet of 1,100 aluminum foil was wound around a cylindrical mandrel. The foil was then wound over with a continuous four mil filament of Borsic (boron with 0.00010 to 0.00015 SiC coating) and plasma sprayed with 1,100 aluminum powder on both sides. The plasma sprayed layer had a porosity of approximately 15 volume percent. The resulting unconsolidated tape was approximately 16 mils thick and was cut into squares 3 inches on a side. From two to six of the squares were stacked with all of the filaments being in the same direction and with the plasma sprayed surface being mated with the foil at each interface. The deck thus formed was placed in a stainless steel foil envelope in order to hold all the pieces in place during handling. The enveloped decks were heated in a furnace to 600° C and passed between rolls of a rolling mill which had been heated to 170° C. The heated decks were rolled with the fiber axis parallel to the roll axis until they were fully densified by making one pass through the heated rolls, which took approximately 30 seconds. The resulting multilayer composite possessed a thickness of 8 mils per layer, had a volume fraction of 24 percent filament, with the plasma sprayed layers being fully densified and bonded to those filaments which it surrounded and to the adjacent foil. The filaments retained a uniform distribution across the cross section of the composite with no filament breakage. Specimens cut from the composites averaged 60,000 psi Ultimate Tensile Strength.

EXAMPLE II

The same materials and conditions described in Example I were used again except that the tapes utilized 6061 aluminum for both foil and spray, had a higher volume fraction of fiber and were plasma sprayed only on one side. Each monolayer tape was approximately 10 mils thick prior to consolidation. The stacked monolayer tapes were heated in a furnace to 400° C and the resulting fully densified multilayer composite had a 40 percent fiber volume fraction. The multilayer composite possessed a thickness of 5 mils per layer. The fibers were uniformly distributed and there was complete bonding as in Example I. The tensile strength of specimens cut averaged out at 109,000 psi.

EXAMPLE III

In this example, monolayer tape was made from 2 mil stainless steel wire, 6061 aluminum foil and plasma sprayed 2024 aluminum powder. The stacked monolayer tapes were heated to 600° C and the resulting densified multilayer composite had a 24 percent fiber volume fraction with uniform fiber distribution. There was complete bonding as in Examples I and II. The tensile strength averaged 101,000 psi.

In the practice of the present invention, it is recognized that modifications can be made and that other materials may be utilized. Other filaments, such as tungsten, molybdenum, titanium and steel, and other plasma sprayed metal matrices, such as magnesium, titanium, nickel or cobalt, may be utilized. It will readily be seen that through the use of the techniques hereinbefore described, multilayer fiber reinforced composites of carefully controlled density can readily and reproducibly be fabricated. While the invention has been described with reference to specific examples, fabrication parameters and materials, these embodiments and conditions are intended to be illustrative only. Various modifications and alternatives, other than those already mentioned will be readily evident to those skilled in the art within the true spirit and scope of the invention as set forth in the appended claims.

What we claim is:

1. A method for manufacturing high strength metal matrix composites reinforced with a plurality of parallel layers of relatively brittle unidirectional filaments comprising:

while in an air atmosphere positioning a plurality of filament reinforced aluminum matrix tapes in a stack, each tape comprising a plurality of unidirectional relatively brittle filaments selected from the group consisting of boron, silicon carbide, silicon carbide coated boron, boron carbide, alumina and carbon embedded in a plasma sprayed aluminum matrix;

placing said stacked tapes between at least one pair of heated rollers; rapidly bringing said stacked tapes to a temperature between the solidus and liquidus of said aluminum matrix without the aid of a protective atmosphere and roll pressing said stacked tapes between said rollers at a pressure of 100–2,000 psi to reduce their thickness and cause densification, said temperature being sufficiently high, in combination with said pressure, to bond said matrix to the filaments embedded therewithin and to contiguous portions of adjacent tapes.

2. The process of claim 1 wherein the thickness of said tapes is reduced by not more than 50 percent.

3. The method of claim 1 wherein said filaments are selected from the group consisting of boron, silicon carbide and silicon carbide coated boron.

4. The invention of claim 3 wherein said temperature is 200°–600° C.

5. The invention of claim 4 wherein said filaments are oriented with their axes parallel to the axes of the rollers.

* * * * *